(12) United States Patent
Nagy et al.

(10) Patent No.: US 9,618,355 B2
(45) Date of Patent: Apr. 11, 2017

(54) ONBOARD UNIT AND METHOD FOR PROVIDING INFORMATION TO A DRIVER

(71) Applicant: Kapsch TrafficCom AG, Vienna (AT)

(72) Inventors: Oliver Nagy, Vienna (AT); Robert Povolny, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 14/589,692

(22) Filed: Jan. 5, 2015

(65) Prior Publication Data

US 2015/0198457 A1 Jul. 16, 2015

(30) Foreign Application Priority Data

Jan. 14, 2014 (EP) .................................... 14151027

(51) Int. Cl.
| | |
|---|---|
| *G01C 21/00* | (2006.01) |
| *G08G 1/123* | (2006.01) |
| *G01C 21/34* | (2006.01) |
| *G01C 21/36* | (2006.01) |
| *G08G 1/0962* | (2006.01) |
| *G08G 1/16* | (2006.01) |
| *G08G 1/0968* | (2006.01) |

(52) U.S. Cl.
CPC ..... *G01C 21/3658* (2013.01); *G08G 1/09626* (2013.01); *G08G 1/096833* (2013.01); *G08G 1/167* (2013.01)

(58) Field of Classification Search
CPC ......... G08G 1/09626; G08G 1/096833; G08G 1/167; G01C 21/3658
USPC ....................................................... 701/431
See application file for complete search history.

(56) References Cited

U.S. PATENT DOCUMENTS

| | | | | |
|---|---|---|---|---|
| 2001/0049582 | A1* | 12/2001 | Sakashita ........... | G01C 21/3658 701/437 |
| 2011/0121992 | A1* | 5/2011 | Konaka ................ | B62D 15/029 340/905 |
| 2011/0125402 | A1* | 5/2011 | Mitsugi .................. | G01C 21/20 701/532 |

(Continued)

FOREIGN PATENT DOCUMENTS

EP 1832844 A1 9/2007

OTHER PUBLICATIONS

Extended European Search Report received for European Patent Application No. 14151027.1, mailed on Feb. 25, 2014, 8 pages.

*Primary Examiner* — Calvin Cheung
*Assistant Examiner* — Paula L Schneider
(74) *Attorney, Agent, or Firm* — Fiala & Weaver P.L.L.C.

(57) ABSTRACT

An onboard unit for a vehicle for providing information to the driver when travelling on a road portion with at least two adjacent lanes forming a common traffic area, the onboard unit having a position detection device for determining the position thereof and having a measured value of the speed thereof, comprising a lane detector, connected to the position detection device, with a map memory for a digital road map for locating in the road map a lane corresponding to the determined position, a traffic jam detector for detecting a traffic jam when at least the speed measured value falls below a predefined threshold value, and an evaluation and output unit, which is connected to the lane detector and the traffic jam detector and which is configured, upon detection of a traffic jam, to output direction of travel information specific for the located lane.

16 Claims, 3 Drawing Sheets

(56) References Cited

U.S. PATENT DOCUMENTS

| | | | |
|---|---|---|---|
| 2011/0213548 A1* | 9/2011 | Tashiro | G01C 21/3658 701/533 |
| 2012/0004835 A1* | 1/2012 | Sato | G08G 1/0104 701/118 |
| 2012/0010797 A1 | 1/2012 | Luo et al. | |
| 2012/0068860 A1* | 3/2012 | Popovic | G08G 1/096783 340/905 |
| 2012/0191344 A1* | 7/2012 | Iao | G01C 21/3658 701/436 |
| 2013/0282264 A1* | 10/2013 | Bastiaensen | G01C 21/3492 701/119 |
| 2014/0343837 A1* | 11/2014 | Nishibashi | G01C 21/3658 701/410 |
| 2014/0365109 A1* | 12/2014 | You | G01C 21/3658 701/409 |

* cited by examiner

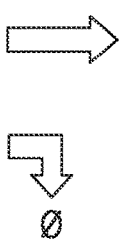
*Fig. 3a*  *Fig. 3b*  *Fig. 3c*  *Fig. 3d*

ONBOARD UNIT AND METHOD FOR PROVIDING INFORMATION TO A DRIVER

CROSS-REFERENCE TO RELATED APPLICATION(S)

This application claims priority to European Patent Application No. 14 151 027.1, filed on Jan. 14, 2014, the entirety of which is incorporated by reference herein.

BACKGROUND

Technical Field

The present subject matter relates to an onboard unit for a vehicle for providing information to the driver when travelling on a road portion with at least two adjacent traffic lanes forming a common traffic area, wherein the onboard unit has a position detection device for detecting the position thereof and has a measured value of the speed thereof. The subject matter also relates to a method for an onboard unit of this type.

Background Art

In road traffic, the driver of a vehicle is often heavily burdened in order to register information going beyond the actual steering of the vehicle under consideration of the surrounding traffic and to respond to said information. In order to make it easier, more efficient and safer to travel on roads in road networks, modern vehicles carry technical apparatuses having different specific functions. By way of example, there are thus onboard units for handling road tolls or onboard navigation apparatuses for orientation, which each, by determination of the position of said onboard units with the aid of a position detection device, for example a satellite navigation system (global navigation satellite system, GNSS), identify vehicle travel on a road portion and where applicable levy toll charges and/or plan additional routes. This relieves the burden on the driver and at the same increases safety in road traffic.

BRIEF SUMMARY

It is an object of the present subject matter to create an onboard unit and a method which inform or advise the driver efficiently and in a precise manner in the case of a traffic jam.

The object may be achieved in accordance with a first aspect with an onboard unit of the type mentioned in the Technical Field, which is characterised by a lane detector, connected to the position detection device, with a map memory for a digital road map for locating in the road map a lane corresponding to the determined position, a traffic jam detector for detecting a traffic jam when at least the speed measured value falls below a predefined threshold value, and an evaluation and output unit, which is connected to the lane detector and the traffic jam detector and which is configured, with detection of a traffic jam, to output direction of travel information specific for the located lane.

In the case of a traffic jam, lane-specific information for the driver is thus output for the first time, by means of which the driver is guided to drive in a certain direction within the lane or to change lane. The onboard unit thus assists the correct driving of the individual vehicle and the coordination of all vehicles equipped with such an onboard unit in the case of a traffic jam. For example, the creation of an "emergency lane" for the access of emergency vehicles to an accident causing the traffic jam is thus assisted, more specifically under consideration of the actual structural circumstances of the used road portion and also under consideration of local or regional requirements.

In accordance with an embodiment, the lane-specific direction of travel information for each lane of the road portion is stored in the map memory and can be read out by the evaluation and output unit. The storage of the direction of travel information concerning each lane in the map memory means that this information can be read out directly and output immediately at the output unit. An evaluation going beyond the mere locating of the direction of travel information in the map memory is not necessary here, thus saving computing effort. If no direction of travel information for the used road portion is stored in the map portion, there is thus also no output. Road portions without emergency lane obligation in the case of a traffic jam are thus also taken into consideration correctly, that is to say without outputting information to the driver.

Alternatively, the lane-specific direction of travel information can be determined by the evaluation and output unit from the position of the located lane relative to all lanes of the road portion and from a stored set of evaluation rules. Such an evaluation does not require much memory space, since the evaluation unit can quickly determine the specific direction of travel information on the basis of simple evaluation steps according to the set of evaluation rules, for example with the aid of an evaluation table. The determined direction of travel information is then output at the output unit without storing separately in the map memory such information concerning each lane of each road portion. Memory volume is thus saved. Furthermore, an adaptation to modified ambient conditions is easily possible in this case by modifying the set of evaluation rules, for example with the aid of a new evaluation table, without replacing the entire digital road map with direction of travel information stored therein.

In accordance with an embodiment, the onboard unit for this purpose further comprises a transceiver for receiving the set of evaluation rules. The set of evaluation rules can thus be adapted easily to regional or local requirements in a memory-space-saving manner. A transceiver, which for example is stationary, for transmitting the new set of evaluation rules to the onboard unit passing by, for example in accordance with the standards ETSI ITS-G5, DSRC, IEEE 802.11 p or WAVE, but also GSM, UMTS, LTE, WLAN etc., can thus be provided for example at borders between regions or countries having different rules for forming an emergency lane and thus having different sets of evaluation rules. Onboard units for road toll systems usually have radio interfaces of the aforementioned type and are therefore particularly suitable.

In accordance with an alternative embodiment, at least two different sets of evaluation rules each assigned to different road portions are stored in the onboard unit. The onboard unit, when determining the lane-specific direction of travel information, can thus select the set of evaluation rules that is assigned to the used road portion. A separate transceiver in the onboard unit can be omitted, and the onboard unit, when determining and outputting the direction of travel information, is not reliant on the transmission quality of the radio connection, which may incur costs, but rather, for example when passing the border of a region or country, the direction of travel information can thus be determined automatically on the basis of the correct set of evaluation rules assigned to the road portion.

It is particularly easy and clearly understandable for the driver if the direction of travel information output by the evaluation and output unit is an instruction to drive to the left/right, optionally with graphical representation. The small variety of options in this case also requires only a very low amount of memory or evaluation effort. Such an instruction to drive to the left/right can also quite simply be output acoustically and/or optically at the output unit. Furthermore, the direction of travel information, if desired, can be visualised by a graphical representation, for example of the lanes of the used road portion and supplemented by the valid set of rules for creating an emergency lane for the driver, whereby the understanding of the situation and the response of the driver are accelerated.

In an embodiment, a speed measured value can be received with the aid of a transceiver of the onboard unit from at least one further onboard unit carried by a further vehicle, wherein the traffic jam detector additionally takes into consideration the received speed measured value for detection of the traffic jam. Onboard units, in particular onboard unit for road toll systems, are nowadays equipped frequently with transceivers of this type for establishing a radio connection to similar onboard units, for example within the scope of a traffic telematics system in accordance with the standards IEEE 802.11 p, DSRC, WAVE or ETSI ITS-G5, and for example form an ad hoc network comprising a plurality of adjacent onboard units, wherein various pieces of information concerning the running state of the vehicle carrying the respective onboard unit are exchanged. It is thus possible in a quite simple manner to detect a traffic jam with assistance by onboard units carried by other vehicles and to attain a greater accuracy in the detection of a traffic jam by comparison or by averaging. Furthermore, by information exchange with the onboard units of vehicles travelling ahead, a traffic jam can already be identified in good time, and the response thereto can thus be better prepared or a traffic jam can be responded to earlier.

In another aspect, the subject matter creates a method for providing information to the driver of a vehicle carrying an onboard unit when travelling on a road portion with at least two adjacent lanes forming a common traffic area, said method comprising the following steps:

determining the position of the vehicle with the aid of a position detection device of the onboard unit and determining a measured value of the speed of the vehicle;

detecting a traffic jam when at least the speed measured values falls below a predefined threshold value, and, upon detection of a traffic jam, locating in a digital road map stored in the onboard unit a lane corresponding to the determined position and outputting direction of travel information specific for the located lane at an output unit of the onboard unit.

With regard to the advantages and further embodiments of the method, reference is made to the previous statements concerning the onboard unit. Here, it is favourable if the lane-specific direction of travel information is determined only in the case that the road portion is marked in the road map for output of direction of travel information. The output of direction of travel information is thus omitted when the vehicle is travelling on a road portion for which no special requirements are provided in the case of a traffic jam. The output of superfluous direction of travel information at the output unit is avoided and the driver is not loaded unnecessarily with information.

The onboard unit, in embodiments, reads out a speed measured value, received via a radio connection from at least one further onboard unit carried by a further vehicle, from a Common Awareness Message in accordance with standard ETSI ITS-G5 or a Basic Safety Message in accordance with standard IEEE 802.11p or WAVE. There is thus no need to establish a bidirectional radio connection or an adhoc network between the vehicles or onboard units thereof; speed and where necessary position of the further onboard unit can be deduced easily from the received message emitted periodically.

BRIEF DESCRIPTION OF THE DRAWINGS/FIGURES

The present subject matter will be explained in greater detail hereinafter on the basis of exemplary embodiments illustrated in the accompanying drawings, in which:

FIGS. 3a-3d show various embodiments of the digital road map of the onboard unit of FIG. 2 with lane-specific direction of travel information (FIGS. 3a, 3b) and lane-specific marking (FIGS. 3c, 3d).

Embodiments will now be described with reference to the accompanying drawings.

DETAILED DESCRIPTION

Figure 1:
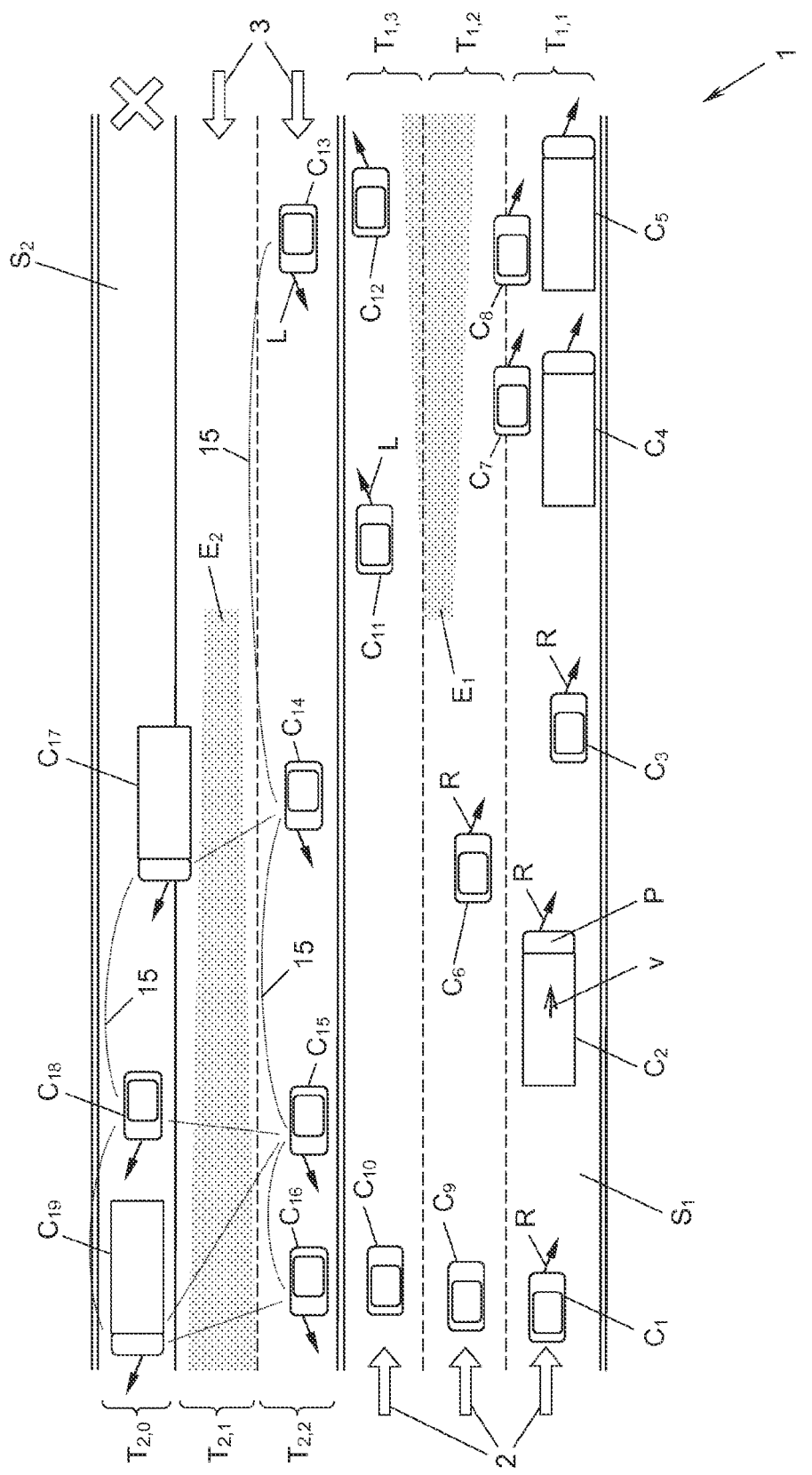
FIG. 1 shows a schematic plan view of two road portions, each used by a number of vehicles, with detection of a traffic jam, according to an embodiment.

In accordance with FIG. 1, a number of vehicles $C_1$, $C_2$, . . . , generally $C_i$, on a road 1 are travelling in two parallel road portions $S_1$, $S_2$, . . . , generally $S_n$, with opposite directions of travel 2, 3. The road portions $S_n$ each have at least two adjacent lanes $T_{1,1}$, $T_{1,2}$, $T_{1,3}$, $T_{2,1}$, $T_{2,2}$, . . . , generally $T_{n,m}$, forming a common traffic area. In the example of FIG. 1, the road portion $S_1$ has three adjacently arranged lanes $T_{1,1}$, $T_{1,2}$, $T_{1,3}$ with a direction of travel 2, whereas the second road portion $S_2$ has two adjacently arranged lanes $T_{2,1}$, $T_{2,2}$ with the opposite direction of travel 3 and also has a breakdown lane or hard shoulder $T_{2,0}$.

Figure 2:
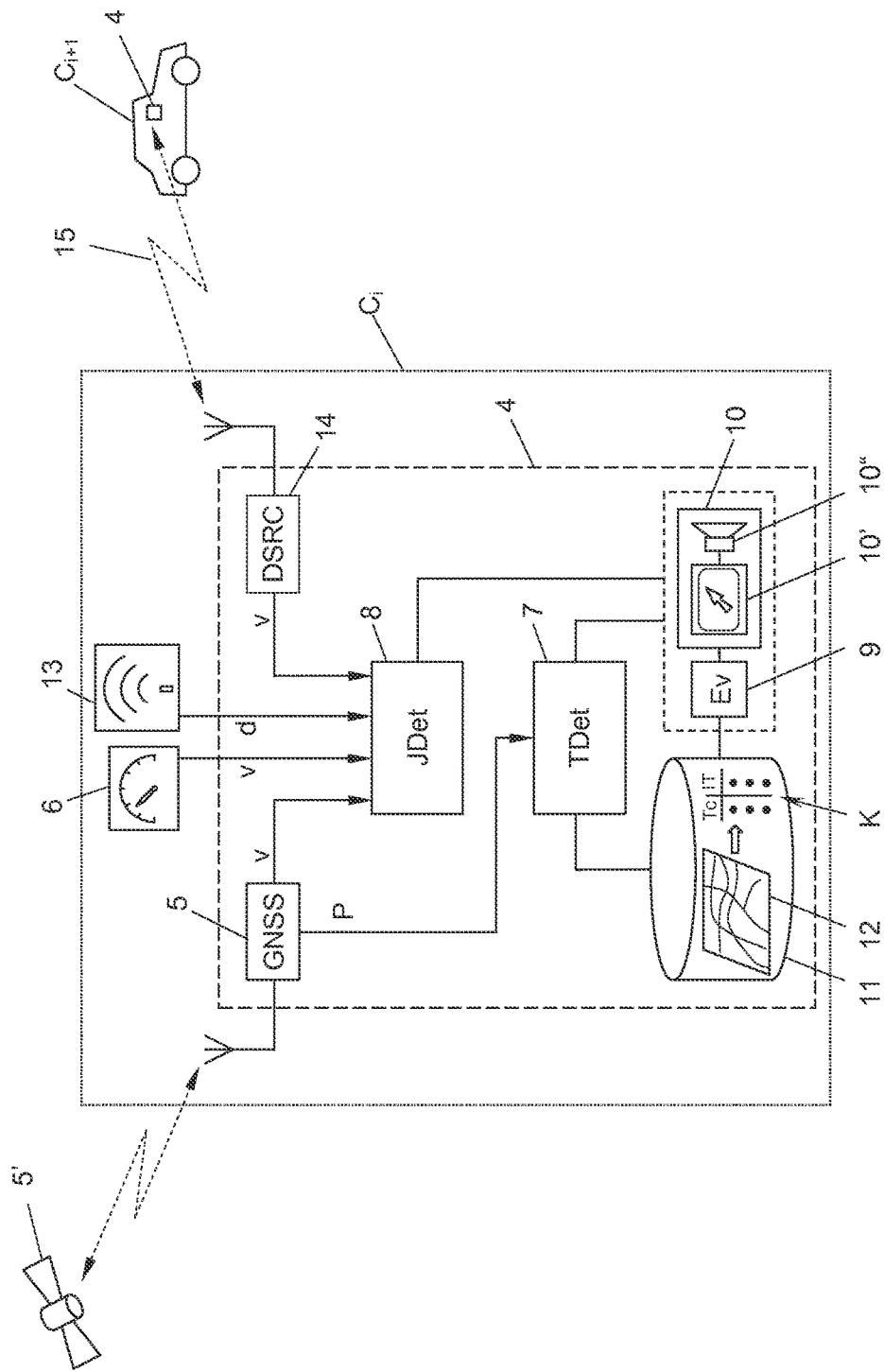
FIG. 2 shows a block diagram of an onboard unit, according to an embodiment.

Each vehicle $C_i$ carries an onboard unit 4 according to FIG. 2. The onboard unit 4 has a position detection device 5, for example a satellite receiver determining the position P of the onboard unit 4 with the aid of satellites 5' of a global navigation satellite system (GNSS). Alternatively, the position detection device 5 could also determine the position P with the aid of terrestrial radio beacons, for example short-range radio beacons according to standards ETSI ITS-G5, DSRC (dedicated short range communication), IEEE 802.11p or WAVE (wireless access in vehicular environments) and/or mobile radio stations (not illustrated).

The onboard unit 4 also has a measured value of the speed v thereof; this speed measured value v can be provided by the position detection device 5 and/or by another sensor, for example a sensor 6 of the vehicle $C_i$, said sensor being connected to the onboard unit 4.

In order to increase the accuracy of the determined position P and speed v, the onboard unit 4 may also average a number of measured values and/or further sensor measured values, for example from an acceleration sensor (not illustrated), or may use computing units for the predictive or corrective estimation of the course of movement (trajectory) of said onboard unit.

In order to inform the driver, in the case of a traffic jam, about the creation of a free emergency lane $E_1$, $E_2$, . . . , generally $E_k$, to be used for example by emergency vehicles, the onboard unit 4 has a lane detector 7, a traffic jam detector 8 and an evaluation unit 9 with connected output unit 10.

The lane detector 7 connected to the position detection device 5 has a map memory 11 for a digital road map 12 and accesses this in order to locate in the stored digital road map 12 the lane $T_{n,m}$ corresponding to the determined position P. The digital road map 12 may be an image of the road 1 illustrating the lanes accurately, for example by means of vectors or polygon courses or another geoobject definition method known to a person skilled in the art, for example in accordance with the standards of the International Organisation for Standardisation ISO 19115, ISO 19119, ISO 14825 or ISO 17575, part 3. The lane detector 7 locates the lane $T_{n,m}$ corresponding to the position P directly in the digital road map 12. Alternatively, the digital road map 12 could show the road 1 without lanes $T_{n,m}$, for example again in the form of vectors or a polygon course, and could contain, for each road portion $S_n$, the associated lane number $Tc_n$, from which the lane detector 7 calculates the used lane $T_{n,m}$ on the basis of the distance of the determined position P from the respective vector or polygon course of the road portion $S_n$ and a known lane width.

The traffic jam detector 8 detects a traffic jam on the basis of at least the speed measured value v, more specifically on the basis of the fact that this falls below a predefined threshold value, for example 10 or 20 km/h. The traffic jam detector 8, in accordance with FIG. 2, can additionally take into consideration a distance measured value d from a vehicle travelling ahead, for example from a distance sensor 13 of the vehicle $C_i$ and/or further speed measured values in order to detect the traffic jam, as explained in detail further below with reference to road portion $S_2$ of FIG. 1.

The evaluation and output unit 9, 10 connected to the lane detector 7 and traffic jam detector 8 is controlled by the traffic jam detector 8. Upon detection of a traffic jam, the evaluation and output unit 9, 10 accesses the map memory 11 and thereupon outputs at the output unit 10 direction of travel information $I_{n,m}$ for the driver, said information being specific for the lane $T_{n,m}$ located by the lane detector 7.

In the simplest case, the direction of travel information $I_{n,m}$ output at the output unit 10 is an instruction to drive to the left/right L, R, which is output via a display 10' and/or a loudspeaker 10" of the output unit 10. Alternatively or additionally, the output unit 10, on the display 10' thereof, could also output for example a graphical illustration of the road portion $S_n$ with lanes $T_{n,m}$ thereof and a detailed, lane-specific illustration of the driving instruction or the locally valid set of rules for creating an emergency lane $E_k$. In order to output the direction of travel information $I_{n,m}$, loudspeakers or displays, for example of a car radio or navigation system, provided in a vehicle $C_i$ could optionally also be used, and the onboard unit 4 could be connected for this purpose to these built-in elements of the vehicle $C_i$.

The locating of the lane $T_{n,m}$ by means of the lane detector 7, similarly to the determination of the position P of the vehicle $C_i$ with the aid of the position detection device 5 and/or the determination of the speed v, is repeated or performed periodically in the illustrated examples, but could alternatively also be triggered merely as required, for example by an external controller or manually. The lane detector 7, similarly to the evaluation and output unit 9, 10, is controlled by the traffic jam detector 8 of the onboard unit 4 and is activated thereby only in the event of detection of a traffic jam, but alternatively could also operate continuously.

It goes without saying that the onboard unit 4 can be integrated in an existing electronic device of the vehicle $C_i$ or can be formed thereby, for example a toll onboard unit for a road toll system, or can be constructed as a modularised ("virtual") onboard unit by networking modules already provided in a vehicle $C_i$. The connection or networking of the modules can be implemented in a wired manner, for example by means of FlexRay™ or CAN bus (controller area network), or wirelessly, for example by means of Bluetooth or WLAN.

In example of FIG. 1, the vehicles $C_1$ to $C_8$, of which the onboard units 4 have located in the road map 12 one of the two right-hand lanes $T_{1,1}$, $T_{1,2}$ of the road portion $S_1$ as the lanes corresponding to the respective determined position P, in view of the traffic jam developing in the road portion $S_1$ (on the right-hand side in FIG. 1), that is to say as a result of the low speed measured value v of said onboard units, obtain an instruction to drive to the right R. On the other hand, the vehicles $C_{11}$ and $C_{12}$, of which the onboard units 4 have located the lanes $T_{1,3}$ as the lanes corresponding to the determined position P, obtain an instruction to drive to the left L as direction of travel information $I_{1,3}$. By contrast, the onboard units 4 of the vehicles $C_9$ and $C_{10}$, as a result of the (previously also) higher speed measured values v thereof, do not detect a traffic jam and therefore also do not output any direction of travel information. The vehicles $C_1$ to $C_8$, $C_{11}$ and $C_{12}$ travelling on the first road portion $S_1$ in the example of FIG. 1 thus form the free emergency lane $E_1$ to be used by emergency vehicles in the case of a traffic jam.

If desired, different lane-specific direction of travel information $I_{n,m}$ can also be output. For example, the vehicles $C_6$ to $C_8$, $C_{11}$, $C_{12}$ in the two left lanes $T_{1,2}$, $T_{1,3}$ could thus receive an instruction to drive to the left L and only those vehicles on the right lane $T_{1,1}$ could receive an instruction to drive to the right R, etc.

In accordance with FIG. 2, the onboard unit 4 of a vehicle $C_i$ may also have a transceiver 14, with which said onboard unit establishes a radio connection 15, for example in accordance with the standards ETSI ITS-G5, DSRC, IEEE 802.11p or WAVE, to at least one further onboard unit 4 carried by a further vehicle $C_{i+1}$. The first-mentioned onboard unit 4 of the vehicle $C_i$ receives a speed measured value v from the further onboard unit 4 of the vehicle $C_{i+1}$, which is additionally taken into consideration by the traffic jam detector 8 of the first-mentioned onboard unit 4 during the detection of the traffic jam for the creation of the emergency lane $E_k$. The speed measured value v of the further onboard unit 4 of the further vehicle $C_{i+1}$ can be read out from a Common Awareness Message (CAM) of the further onboard unit 4 received in the first-mentioned onboard unit 4 in accordance with the standard ETSI ITS-G5 or from a Basic Safety Message (BSM) of the further onboard unit 4 in accordance with the standards IEEE 802.11p or WAVE.

In this way, the onboard unit 4 of a vehicle $C_i$ is provided with an additional speed measured value v from at least one onboard unit 4 of a vehicle $C_{i+1}$, for example travelling ahead, such that the first-mentioned onboard unit can already identify the development of a traffic jam in good time, as is illustrated in FIG. 1 for the vehicle $C_{13}$ of the road portion $S_2$ communicating via the radio connection 15 with the vehicle $C_{14}$, said vehicle $C_{13}$ thus being able to already determine in good time a driving instruction—here the instruction to drive to the left L. The onboard unit 4 of the vehicle $C_i$ identifies a vehicle travelling ahead $C_{i+1}$, for example on the basis of the position P of the vehicle $C_{i+1}$ relative to the position P of said vehicle $C_i$, this position of the vehicle $C_{i+1}$ being received by the onboard unit of the vehicle $C_i$ for example in the CAM or BSM.

FIGS. 3a-3d show various examples for the determination of the lane-specific direction of travel information $I_{n,m}$ by the evaluation unit 9.

In the example of FIG. 3a, an instruction to drive to the left/right L or R respectively is stored in the road map 12 separately for each lane $T_{n,m}$ of each road portion $S_n$ as direction of travel information $I_{n,m}$, which the evaluation unit 9 reads out directly for the located lane $T_{n,m}$ in the case of a detected traffic jam—for example the instruction to drive to the right R for the vehicle $C_6$ on the lane $T_{1,2}$. Alternatively, as illustrated in the example of FIG. 3b, the lane-specific direction of travel information $I_{n,m}$ could be stored in coded form in the road map 12 as a road-portion-specific data field $Is_n$. Here, the evaluation unit 9 determines the direction of travel information $I_{n,m}$ corresponding to the used lane $T_{n,m}$ from the character sequence—for example for the vehicle $C_6$ on the second lane $T_{1,2}$ of the road portion $S_1$, the second position of the data field $Is_1$="RRL", therefore the instruction to drive to the right R.

If a road portion $S_n$, for example the road portion $S_3$ in FIGS. 3a and 3b, contains no lane-specific direction of travel information $I_{n,m}$, for example because it is a single-lane or inner city road portion $S_n$, where no emergency lane $E_k$ is to be created, the onboard unit 4 thus does not output any information to the driver, even in the event of a traffic jam.

According to FIGS. 3c and 3d, in a further alternative variant, merely one marking $M_n$ may be stored in the digital road map 12 for each road portion $S_n$ in addition to a road-portion-specific lane number $Tc_n$. A set marking $M_n$="Y" signals here that direction of travel information $I_{n,m}$ is to be determined for this road portion $S_n$. In this case, the evaluation unit 9 of the onboard unit 4 of the vehicle $C_i$ accesses a set of evaluation rules K stored for example in the map memory 11 or in another memory (not shown in FIG. 2) of the onboard unit 4, said set of evaluation rules linking the lane number $Tc_n$ to a lane-number-dependent data field IT comprising the direction of travel information $I_{n,m}$ for example as illustrated in FIG. 3d, and determines from this, for the vehicle $C_i$, on the basis of the position of the located lane $T_{n,m}$ relative to all lanes of the road portion $S_n$, the associated direction of travel information $I_{n,m}$ in the manner described with reference to the examples of FIG. 3a or 3b. For example for the vehicle $C_6$ in the middle lane of three lanes $T_{1,1}$, $T_{1,2}$, $T_{1,3}$ of the road portion $S_1$, the instruction to drive to the right R stored in the middle of the data field IT="RRL" valid for $Tc_n$=3 is thus determined as direction of travel information $I_{n,m}$.

The set of evaluation rules K or the lane-number-dependent data field IT of the set evaluation rules K can be received via the transceiver 14 or another interface of the onboard unit 4, for example at country or region borders, and stored in the onboard unit 4 for adaptation to different sets of rules for creating an emergency lane, for example in different countries or regions. Here, the onboard unit 4 may store beforehand a set of evaluation rules K corresponding to the country of the approval authority and, with each journey into a country or region with different sets of rules, can store the additionally received set of evaluation rules K instead or in addition.

Alternatively, the onboard unit 4 could store at least two different sets of evaluation rules K each assigned to different road portions $S_n$ and, when determining the lane-specific direction of travel information $I_{n,m}$, could select the set of evaluation rules K assigned to the road portion $S_n$ detected as the used road portion.

For example, all road portions $S_n$ of a certain geographic area, for example of a country or a region having uniform sets of rules for creating an emergency lane may thus be assigned a first set of evaluation rules K, and the road portions $S_n$ of another geographic area with different emergency lane rules can thus be assigned a different second set of evaluation rules K. The onboard unit 4, in the case of an area change, for example the passing of a border from one country into another, can thus select "automatically" so to speak the set of evaluation rules K to be applied, on the basis of the determined position P of said onboard unit.

If, by contrast, as shown in FIG. 3c for the road portion $S_3$, the marker $M_n$ is not set for a road portion $S_n$ ($M_n$="N"), no direction of travel information $I_{n,m}$ is determined or output.

CONCLUSION

Accordingly, the invention is not limited to the presented embodiments, but comprises all variants and modifications falling within the scope of the accompanying claims.

What is claimed is:

1. An onboard unit for a vehicle for providing information to a driver of the vehicle when travelling on a road portion with at least two adjacent lanes forming a common traffic area, wherein the onboard unit has a position detection device for determining a position thereof and has a measured value of a speed thereof, wherein the onboard unit comprises:
   a lane detector, connected to the position detection device, with a map memory, in which a digital road map and lane-specific direction of travel information for each lane of the road portion are stored, for locating in the road map a lane corresponding to the determined position,
   a traffic jam detector for detecting a traffic jam when at least the speed measured value falls below a predefined threshold value, and
   an evaluation and output unit, which is connected to the lane detector and the traffic jam detector and which is configured, upon detection of a traffic jam, to read out, for the located lane, the lane-specific direction of travel information stored in the map memory, and to output the read-out direction of travel information for the driver.

2. The onboard unit according to claim 1, wherein the direction of travel information output by the evaluation and output unit is an instruction to travel to the left or to the right.

3. The onboard unit according to claim 2, wherein the instruction includes a graphical illustration.

4. The onboard unit according to claim 1, wherein a speed measured value can be received with the aid of a transceiver of the onboard unit from at least one further onboard unit carried by a further vehicle, wherein the traffic jam detector additionally takes into consideration the received speed measured value for detection of the traffic jam.

5. An onboard unit for a vehicle for providing information to a driver of the vehicle when travelling on a road portion with at least two adjacent lanes forming a common traffic area, wherein the onboard unit has a position detection device for determining a position thereof and has a measured value of a speed thereof, wherein the onboard unit comprises:
   a lane detector, connected to the position detection device, with a map memory, in which a digital road map and a road-portion-specific number of lanes are stored, for locating in the road map a lane corresponding to the determined position,
   a traffic jam detector for detecting a traffic jam when at least the speed measured value falls below a predefined threshold value, and an evaluation and output unit, which is connected to the lane detector and the traffic jam detector and which is configured, upon detection of a traffic jam, to determine, for the located lane, the lane-specific direction of travel information by accessing a set of evaluation rules stored in the onboard unit, which set of evaluation rules links the road-portion-specific number of lanes of said road portion to a lane-number-dependent data field comprising the direction of travel information, and to output the determined direction of travel information for the driver.

6. The onboard unit according to claim 5, wherein the onboard unit further comprises a transceiver for receiving the set of evaluation rules.

7. The onboard unit according to claim 5, wherein at least two different sets of evaluation rules each assigned to different road portions are stored in the onboard unit.

8. A method for providing information to a driver of a vehicle carrying an onboard unit when driving on a road portion with at least two adjacent lanes forming a common traffic area, said method comprising the following steps:
    determining the position of the vehicle with aid of a position detection device of the onboard unit;
    determining a measured value of the speed of the vehicle;
    detecting a traffic jam when at least the speed measured value falls below a predefined threshold value, and,
    upon detection of the traffic jam,
    locating a lane, corresponding to the determined position, in a digital road map stored in the onboard unit, and
    outputting at an output unit of the onboard unit direction of travel information specific for the located lane, wherein lane-specific direction of travel information for each lane of the road portion is stored in the digital road map and the direction of travel information specific for the located lane is read out from the digital road map.

9. The method according to claim 8, wherein the direction of travel information is determined only in the case that the road portion is marked in the digital road map for output of direction of travel information.

10. The method according to claim 8, wherein the output unit, as direction of travel information, outputs an instruction to drive to the left or to the right, optionally with graphical illustration.

11. The method according to claim 10, wherein the instruction includes a graphical illustration.

12. The method according to claim 8, wherein the onboard unit further receives, via a radio connection, a speed measured value from at least one further onboard unit carried by a further vehicle, wherein the received speed measured value is additionally taken into consideration with detection of the traffic jam.

13. The method according to claim 12, wherein the onboard unit reads out the received speed measured value from a Common Awareness Message according to the standard ETSI ITS-G5 or from a Basic Safety Message according to the standard IEEE 802.11p or WAVE.

14. A method for providing information to a driver of a vehicle carrying an onboard unit when driving on a road portion with at least two adjacent lanes forming a common traffic area, said method comprising the following steps:
    determining the position of the vehicle with aid of a position detection device of the onboard unit;
    determining a measured value of the speed of the vehicle;
    detecting a traffic jam when at least the speed measured value falls below a predefined threshold value, and,
    upon detection of the traffic jam,
    locating a lane, corresponding to the determined position, in a digital road map stored in the onboard unit, and
    outputting at an output unit of the onboard unit direction of travel information specific for the located lane, wherein a road-portion-specific number of lanes is stored in the digital road map, and the lane-specific direction of travel information is determined from a stored set of evaluation rules which links the road-portion-specific number of lanes of said road portion to a lane-number-dependent data field comprising the direction of travel information.

15. The method according to claim 14, wherein the onboard unit receives and stores the set of evaluation rules via a radio connection.

16. The method according to claim 14, wherein the onboard unit stores at least two different sets of evaluation rules each assigned to different road portions, wherein, when determining the lane-specific direction of travel information, the set of evaluation rules assigned to the used road portion is selected.

* * * * *